Figure 1:
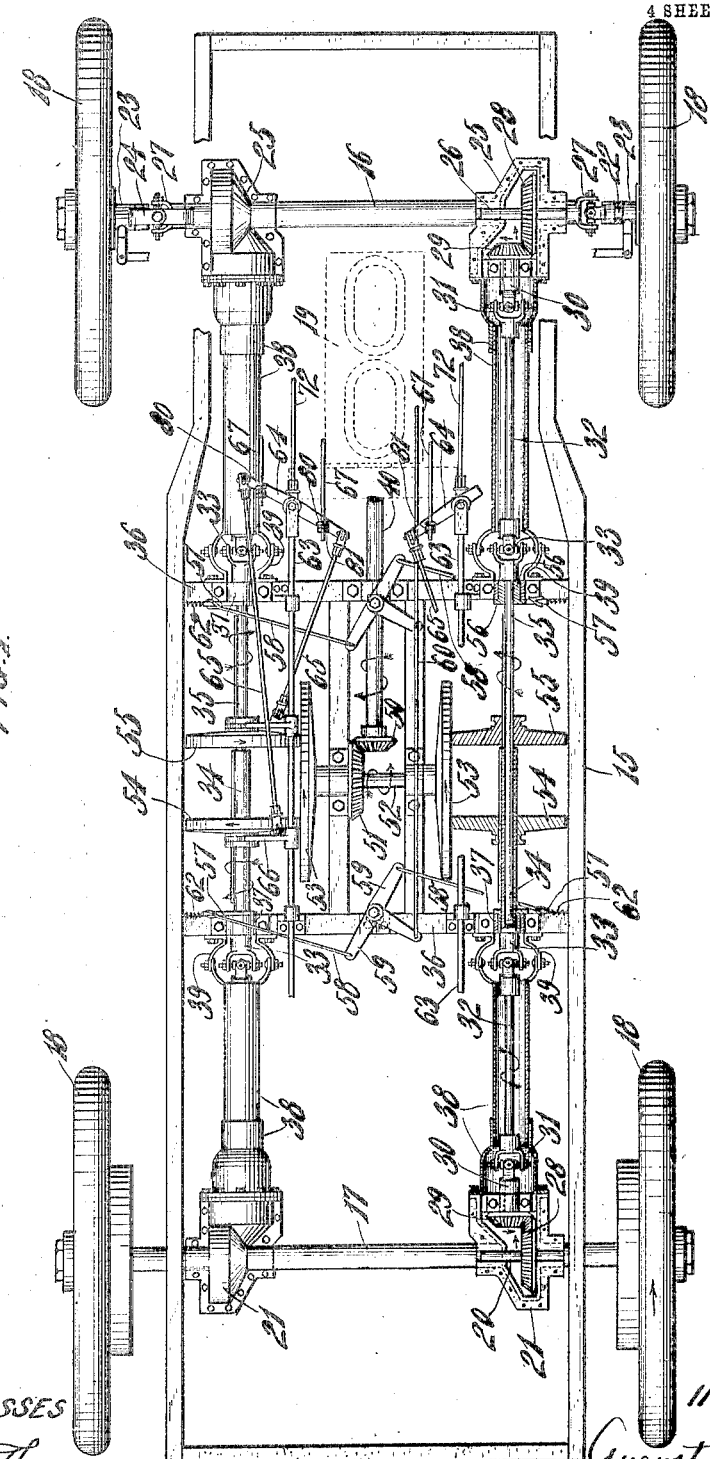

A. E. HOLTERMANN.
FOUR WHEEL DRIVE.
APPLICATION FILED MAR. 21, 1913.

1,108,367.

Patented Aug. 25, 1914.
4 SHEETS—SHEET 1.

WITNESSES
R. J. Thiener
Katherine Holt

INVENTOR
August E. Holtermann
By Morsell & Caldwell
ATTORNEYS.

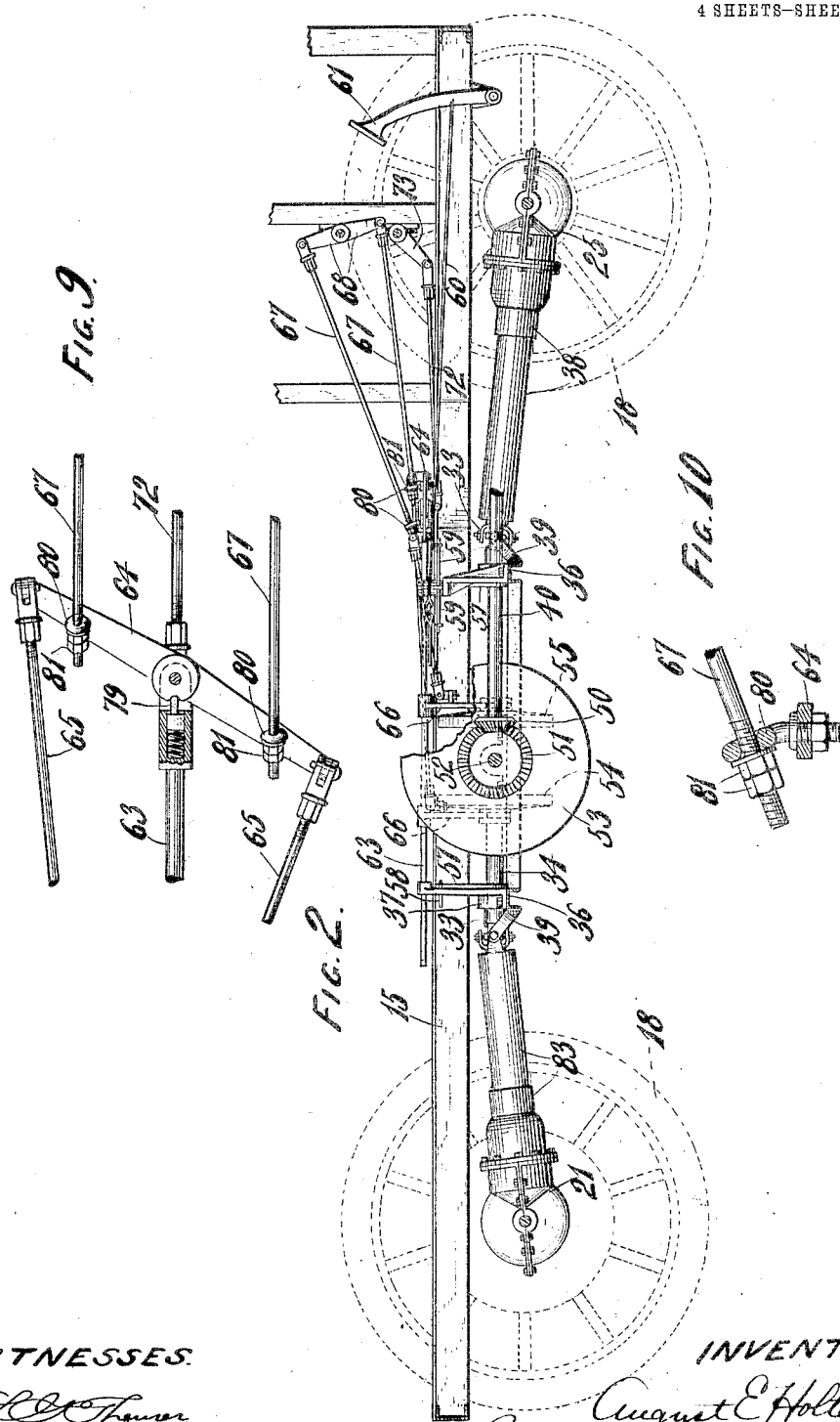

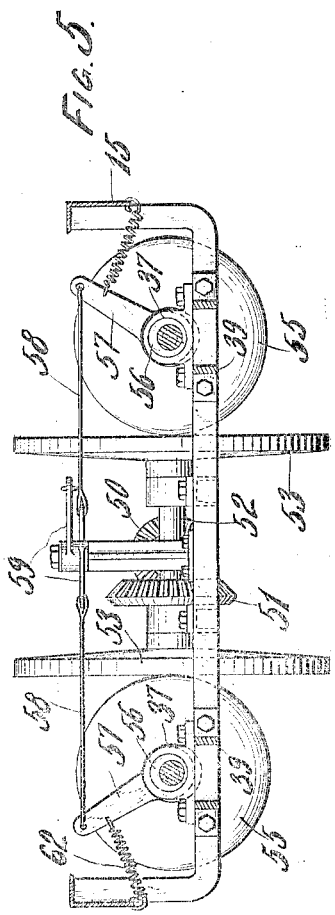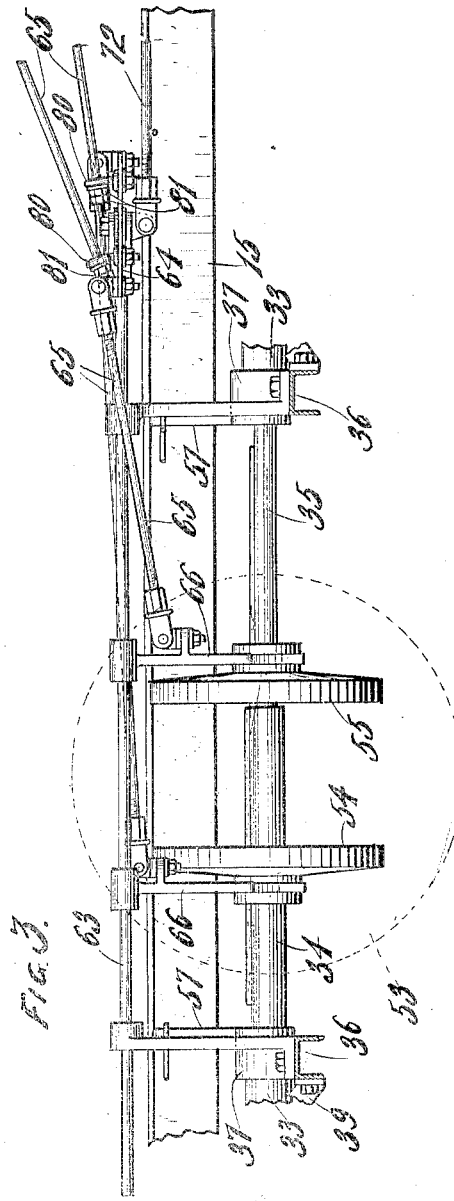

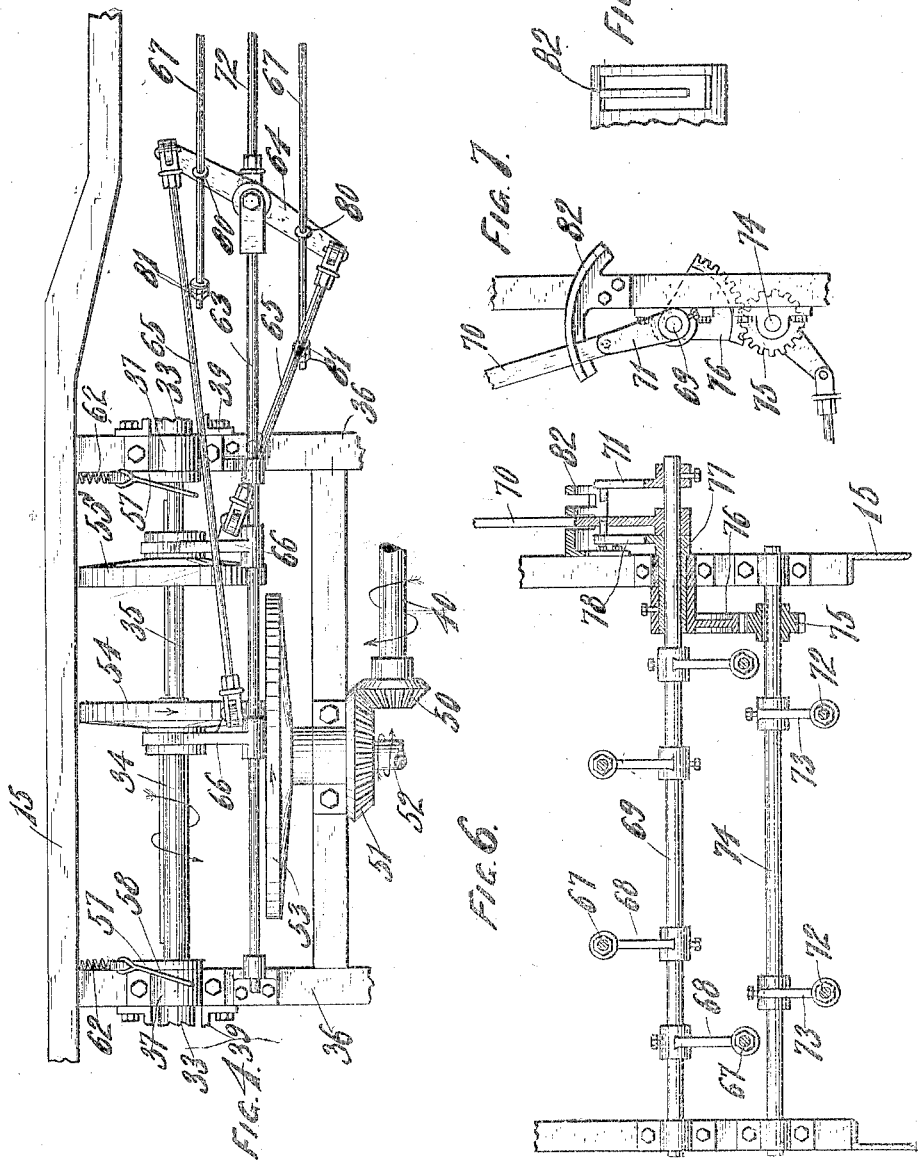

UNITED STATES PATENT OFFICE.

AUGUST E. HOLTERMANN, OF DEPERE, WISCONSIN.

FOUR-WHEEL DRIVE.

1,108,367.  Specification of Letters Patent.  Patented Aug. 25, 1914.

Application filed March 21, 1913. Serial No. 755,897.

*To all whom it may concern:*

Be it known that I, AUGUST E. HOLTERMANN, a citizen of the United States, and resident of Depere, in the county of Brown and State of Wisconsin, have invented new and useful Improvements in Four-Wheel Drives, of which the following is a description, reference being had to the accompanying drawings, which are a part of this specification.

This invention has for its object to provide a driving mechanism by means of which the driving effort of the engine may be distributed throughout all four wheels and vehicle, thus increasing the traction by enlarging the traction surface and making the driving operation more uniform.

Another object of the invention is to provide such driving mechanism which will be capable of reversing the direction of travel of the vehicle by the use of the same parts used for driving the vehicle forwardly.

Another object of the invention is to perfect details of construction of four wheel drive mechanism of this character.

With the above and other objects in view the invention consists in the four wheel drive mechanism as herein claimed and all equivalents.

Referring to the accompanying drawings in which like characters of reference indicate the same parts in different views: Figure 1 is a plan view of a chassis of an automobile truck or the like showing a four wheel drive mechanism of this invention embodied therein; Fig. 2 is a central longitudinal sectional view; Fig. 3 is a side view of the friction wheels for driving the front and rear wheels on one side of the car; Fig. 4 is a plan view of similar parts for driving the front and rear wheels on the other side of the car, the parts being in position for driving the car rearwardly; Fig. 5 is a rear view of the frictional driving means, showing the eccentric sleeves for effecting the frictional engagement of the friction wheels with the friction disks; Fig. 6 is a sectional view looking forwardly at the speed controlling lever and its connection with the reversing shaft; Fig. 7 is a side elevation of these parts; Fig. 8 is a detail view of the slotted plate in which the speed controlling lever travels; Fig. 9 is a detail plan view of one of the speed controlling walking beams; and, Fig. 10 is a detail view of one of the rod connections thereof.

In these drawings 15 indicates the vehicle frame mounted as usual upon springs not shown on the front and rear axles 16 and 17 respectively. The axles, however, are not of the usual type, for each of the four wheels 18 of the vehicle is independently driven from the engine 19, the rear wheels being mounted on stub shafts 20 which are journaled within gear casings 21 at the ends of the rear axles 17 while the front wheels are mounted on stub shafts 22 carried by sleeves 23 which are pivotally mounted by means of ordinary knuckle joints 24 on gear casings 25 at the end of the front axle 16, there being short shafts 26 within the gear casings 25 connected by universal joints 27 with the stub shafts 22 of said front wheels. Both the shafts 20 of the rear wheels and the shafts 26 of the front wheels are provided with beveled gears 28 within the gear casings and beveled pinions 29 mesh therewith. These beveled pinions 29 are on short shafts 30 which are journaled in bearings through the gear casings and have universal connections 31 with torsion rods 32 which also have universal connections 33 with shafts 34 and 35 respectively, the former in driving connection with the rear wheels of the vehicle being tubular and having the shaft 35 fitting therein. The shafts 34 and 35 are journaled in bearings 37 on a drop frame 36 extending across the main frame 15 and tubular telescoping housings 38 surround the torsion rods 32 and their universal joints are pivotally connected at their inner or upper ends with brackets 39 on the drop frame 36.

The engine shaft 40 has a beveled pinion 50 at its rear end meshing with a beveled pinion 51 on a driving shaft 52 extending transversely of the vehicle and journaled in bearings on an intermediate part of the drop frame 36 and with friction disks 53 at its two ends. The shafts 34 and 35 on each side of the car are provided with friction wheels 54 and 55 respectively which are splined thereon and which are adapted to contact with the faces of the friction disks 53. They may be brought into or out of contact with the frictional disks 53 by mean of eccentric sleeves 56 mounted between them and their bearings 37 which eccentric sleeves, as most clearly seen in Fig. 1 and Fig. 5, have crank arms 57 connected by rods 58 with arms of a lever 59, there being one such lever 59 at the front of the drop frame 36, and one at the rear thereof for the front bearings and rear bearings respectively and both of the levers 59 are connected with a rod 60 which extends forwardly and as shown in Fig. 2 connects with a treadle 61 corresponding with an ordinary clutch treadle. The arms 57 of the eccentric sleeves 56 have springs 62 for returning them to the position in which the friction wheels 54 and 55 are held in frictional contact with friction disks 53. Thus the pressure of the foot of the operator against treadle 61 removes the frictional engagement of the friction wheels with the friction disks to release the driving connection and when said treadle is permitted to return to its normal position the driving connection is again restored, the action corresponding with that of an ordinary clutch. The friction wheels 54 and 55 are shifted over the faces of the friction disks 36 to bring their frictional engagement therewith nearer to or farther from the center of said disks in order to vary the speed of the vehicle and provision is made for equalizing this adjustment so that all four of the friction wheels will at all times be at the same distance from the center of the friction disks so that all of the vehicle wheels may be driven at the same speed. Shifting rods 63 are slidably mounted in bearings on the drop frame 36 and at their front ends are pivotally mounted thereon walking beams 64, the opposite ends of which are connected by rods 65 with shifting arms 66 which are slidably mounted on the rods 63 and have their yoked ends fitting in grooved hubs of the friction wheels 54 and 55 respectively so that a rocking movement of the walking beams 64 causes a sliding movement of the friction wheels 54 and 55 on their shafts 34 and 35, said friction wheels, however, remaining in driving connection with their shafts throughout such sliding adjustment by reason of their splined connection therewith. Connecting rods 67 connect the opposite ends of the walking beams 64 with oppositely extending crank arms 68 on a shaft 69 which is journaled in upright portions of the frame at the front of the car and a hand lever 70 loosely mounted on the shaft 69 has an opening adapted to engage a pin on an arm 71 which is fixed on the shaft 69 and at such times the shaft may be rocked by means of the hand lever to swing the crank arms 68 and through the rods 67 produce a swinging movement of the walking beams 64 and thereby shift the friction wheels over the faces of the friction disks so that they will be positioned nearer to or farther from the center of the friction disks to vary the driving speed.

The shifting rods 63 are connected by rods 72 with crank arms 73 on a shaft 74 journaled across the frame beneath the shaft 69 and said shaft 74 has a pinion 75 meshing with a segmental gear 76 which is fixed on a sleeve 77 surrounding the shaft 69 and passing through the bearing thereof. The sleeve 77 has a crank arm 78 with a pin also adapted to be engaged by the opening in the hand lever 70 and when so engaged the movements of the hand lever 70 cause the sleeve 77 to turn and rock the shaft 74 and thus through the rod connections 72 pull upon the shifting rod 63, sliding said rod through its bearings and carrying with it the walking beams 64 and both of the friction wheels connected therewith so as to carry the front friction wheels beyond the edge of the friction disks and bringing the rear friction wheels in front of the centers of the friction disks for reversing the direction of movement of the car. In order to prevent the walking beams losing their normal position during this shifting movement for reversing the driving of the car the shifting rods 63 have spring latch pins 79 engaging notches on the walking beams as best seen in Fig. 9 and this forward movement of the walking beams is permitted by the rods 67 freely sliding through bent eyes 80 which form other connections with the walking beams, there being a pair of set nuts 81 on the ends of the rods 67 to engage said eyes for swinging the walking beams when a pulley movement is exerted upon either of the rods 67 as during the speed changing operation previously described. In order that the hand lever 70 may be required to return parts to their normal position in either of its operative connections before changing to its other operative connection it works through a slotted guide plate 82 rigidly mounted on the upright portion of the frame, the slot thereof being of a U shape. The hand lever 70 may work in either portion of the slot and while in one portion thereof it is in engagement with the pin of crank arm 71 to turn the shaft 69 for varying the speed adjustment while in the other position it is in engagement with the pin of crank arm 78 to turn the shaft 74 for effecting the reverse drive position of the parts.

In operation the friction disks 53 driven directly from the engine may turn freely while the treadle 61 is depressed so as to hold the friction wheels 54 and 55 out of engagement with the friction disks, but upon releasing the treadle the friction wheels are moved into engagement with the friction disks at the same distance from the center thereof and on opposite sides of the center so that the friction wheels are driven from the friction disks in opposite directions. The friction wheels being splined on their shafts 34 and 35 respectively cause said shafts to turn in opposite directions and through their driving connections with the pinions 29 cause them also to turn, but the pinions 29 being differently positioned with relation to the beveled pinions 28 of the vehicle wheels, one pinion being in front of and the other pinion in the rear of said pinions 28, the wheels are caused to turn in the same direction. By shifting the hand lever 70 while in its engagement with the pin of crank arm 71 the friction wheels 54 and 55 may be moved farther apart to increase the driving speed and the speed may thus be varied at will. When it is desired to reverse the driving connection it is first necessary to return the hand lever 70 to its position for the lowest speed before shifting it into the other side of the U-shaped slot in its guide plate 82 and in this position of the parts the latch 79 by engaging the notches of the walking beams prevents a further rocking movement of the walking beams until the hand lever is again engaged with the pin of crank arm 71 to effect the forward drive. When the hand lever is thrown into the reversing position it turns the shaft 74 and thereby slides the friction wheels to the position shown in Fig. 4 in the manner previously described, carrying the friction wheel for the front wheels of the vehicle out of the range of the friction disks and bringing the friction wheel for the rear wheels of the vehicle to the front of the center of the friction disks so that their direction of rotation is reversed and consequently the vehicle is backed, being propelled by its rear wheels only.

By means of this invention four separate and independent transmission means are provided, one for each of the four wheels of the vehicle and all driven from the engine shaft. Furthermore by the provision of the walking beams and connecting rod shifting mechanism for the friction wheels whereby the friction wheels of each pair are moved simultaneously and equally in opposite directions the driving speed of the vehicle wheels may be maintained the same throughout all of the variations of speed from the minimum speed to the maximum speed. With all four driving wheels of the vehicle of the same size the friction wheels will be positioned at equal distances from the center of the friction disks on opposite sides of the center, but in the event of the front wheels of the vehicle being smaller than the rear wheels a compensating adjustment may be made whereby the friction wheels for the front wheels of the vehicle will be positioned farther from the center of the friction disks than the other friction wheels.

The universal joint connections between the driving shafts and the torsion rods permits the driving shafts to have the slight lateral movement necessary to bring the friction wheels into and out of frictional engagement with the friction disks by the adjustment of the eccentric sleeves and the pressure of the friction wheels in opposite directions against the friction disks equalizes to relieve the bearings of the driving shaft 52 from wear.

What I claim as new and desire to secure by Letters Patent is:

1. A transmission means for motor vehicles, comprising a driving shaft, friction disks thereon, pairs of friction wheels bearing against the friction disks in opposite directions on opposite sides of the axis of the driving shaft and having independent driving connection with the four wheels of the vehicle.

2. A transmission means for motor vehicles, comprising a driving shaft, friction disks thereon, friction wheels bearing against the friction disks in opposite directions and on opposite sides of the axis of the driving shaft, pairs of transmission shafts on which the friction wheels are splined, driving connections between the transmission shafts and the several wheels of the vehicle, and means for shifting the friction wheels on the transmission shafts simultaneously in opposite directions for equally varying the driving speed of the several vehicle wheels.

3. A transmission means for motor vehicles, comprising a driving shaft, friction disks thereon, friction wheels bearing against the friction disks in opposite directions and on opposite sides of the axis of the driving shaft, pairs of transmission shafts on which the friction wheels are splined, driving connections between the transmission shafts and the several wheels of the vehicle, suitably mounted walking beams, connecting rods connecting the ends of the walking beams with the friction wheels, and means for swinging the walking beams for causing a shifting of the friction wheels on their transmission shafts in opposite directions.

4. A transmission means for motor vehicles, comprising a driving shaft, friction disks thereon, friction wheels bearing against the friction disks in opposite directions and on opposite sides of the axis of the driving shaft, pairs of transmission shafts on which the friction wheels are splined, driving connections between the transmission shafts and the four wheels of the vehicle, suitably mounted walking beams, connecting rods connecting the ends of the walking beams with the friction wheels, means for swinging the walking beams for causing a shifting of the friction wheels on their transmission shafts in opposite directions, and means for bodily moving the walking beams to carry one friction wheel of each pair out of engagement with the friction disks and for carrying the other friction wheels beyond the center of the friction disks for reversing the direction of drive of the vehicle.

5. A transmission means for vehicles, comprising a driving shaft, friction disks thereon, friction wheels engaging the friction disks on opposite faces thereof and on opposite sides of the center thereof, pairs of interfitting transmission shafts adjustably mounted to have a movement nearer to or farther from the friction disks, friction wheels splined on the transmission shafts, driving connections for connecting the transmission shafts with the several wheels of the vehicle, slidably mounted rods, walking beams fulcrumed on the slidable rods, connecting rods connecting the ends of the walking beams with the friction wheels whereby the swinging movements of the walking beams produces a sliding movement in opposite directions of the friction wheels in each pair for equally varying the driving speed of the vehicle wheels, and means for moving the slidable rods for carrying one friction wheel of each pair beyond the edge of the friction disks and for carrying the other friction wheel of each pair beyond the center of the friction disks for reversing the driving direction of the vehicle.

6. A transmission means for motor vehicles, comprising a driving shaft, friction disks thereon, pairs of transmission shafts adjustable toward and away from the friction disks, pairs of friction wheels splined on the transmission shafts and meshing with the friction disks, driving connections for connecting the transmission shafts and meshing with the friction disks, driving connections for connecting the transmission shafts with the several vehicle wheels, slidably mounted rods, walking beams fulcrumed on the slidable rods, connecting rods connecting the ends of the walking beams with the friction wheels, spring latches for yieldingly holding the walking beams in their normal position, a shaft having oppositely positioned cranks connected with the opposite ends of the walking beams, another shaft having cranks connected with the sliding rods, and an operating lever having selective engagement with either of the said shafts for causing the swinging of the walking beams to vary the driving speed of the vehicle or for causing the sliding of the slidable rods to carry one friction wheel of each pair beyond the edge of the friction disks and to carry the other friction wheel of each pair beyond the center of the friction disks for reversing the direction of drive of the vehicle.

7. A transmission means for motor vehicles, comprising a driving shaft, friction disks thereon, pairs of interfitting transmission shafts adjustable toward or away from the friction disks, friction wheels splined on the transmission shafts and engaging the friction disks on opposite faces and on opposite sides of the centers of the friction disks to turn the transmission shafts of each pair in opposite directions, means for shifting the friction wheels over the friction faces of the friction disks, vehicle wheels mounted on suitably journaled spur shafts, beveled gears on the spur shafts, beveled pinions meshing with the beveled gears in front of the beveled gears of the rear wheels and in back of the beveled gears of the front wheels, and torsion rods having universal joint connections with the beveled pinions and the transmission shafts.

8. Transmission means for motor vehicles, comprising a driving shaft, friction disks thereon, pairs of interfitting transmission shafts adjustable toward or away from the friction disks, friction wheels splined on the transmission shafts and engaging the friction disks on opposite faces and on opposite sides of the center of the friction disks to turn the transmission shafts of each pair in opposite directions, means for shifting the friction wheels over the friction faces of the friction disks, vehicle wheels mounted on suitably journaled spur shafts, beveled gears on the spur shafts, gear housings surrounding the beveled gears, beveled pinions journaled in the gear housings and meshing with the beveled gears in front of the beveled gears of the rear wheels and in back of the beveled gears of the front wheels, torsion rods having universal joint connections with the beveled pinions and the transmission shafts, and torsion rod casings having pivotal connection with the bearings of the transmission shafts and having telescoping connection with the gear housings.

In testimony whereof, I affix my signature, in presence of two witnesses.

AUGUST E. HOLTERMANN.

Witnesses:
  GEO. W. QUATSO,
  H. P. DE BORN.